United States Patent
Raghavan et al.

(10) Patent No.: US 10,171,314 B2
(45) Date of Patent: Jan. 1, 2019

(54) METHODS, APPARATUSES AND COMPUTER PROGRAM PRODUCTS TO DERIVE QUALITY DATA FROM AN EVENTUALLY CONSISTENT SYSTEM

(71) Applicant: HERE GLOBAL B.V., Eindhoven (NL)

(72) Inventors: Gopalakrishna Raghavan, Burlington, MA (US); Vikram Malaiya, Burlington, MA (US); Aravindhan Damodharan, Woburn, MA (US); Ganeshwaran Jayachandran, Tyngsboro, MA (US); Kalyan Kotamarthi, Burlington, MA (US)

(73) Assignee: HERE Global B.V., Eindhoven (NL)

( * ) Notice: Subject to any disclaimer, the term of this patent is extended or adjusted under 35 U.S.C. 154(b) by 316 days.

(21) Appl. No.: 14/955,542

(22) Filed: Dec. 1, 2015

(65) Prior Publication Data

US 2017/0155561 A1 Jun. 1, 2017

(51) Int. Cl.
*G06F 15/16* (2006.01)
*H04L 12/24* (2006.01)

(52) U.S. Cl.
CPC ...... *H04L 41/5035* (2013.01); *H04L 41/5029* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 5,829,001 A * | 10/1998 | Li | ...................... | G06F 17/30377 |
| 6,615,034 B1 * | 9/2003 | Alloune | ............... | G06Q 20/102 379/121.01 |
| 6,730,079 B2 * | 5/2004 | Lovewell | ........... | A61B 18/1206 606/34 |
| 6,985,944 B2 * | 1/2006 | Aggarwal | ............. | H04L 41/069 707/999.003 |
| 7,007,009 B2 * | 2/2006 | Bestgen | ............ | G06F 17/30469 |
| 7,079,963 B2 * | 7/2006 | Gloor | ............... | G05B 19/41875 702/179 |
| 7,149,295 B2 * | 12/2006 | Baker | ................. | H04M 3/4931 379/121.01 |
| 7,386,757 B2 * | 6/2008 | Lindenstruth | ....... | G06F 11/1076 714/6.1 |

(Continued)

*Primary Examiner* — Alicia Baturay
(74) *Attorney, Agent, or Firm* — Alston & Bird LLP

(57) ABSTRACT

An apparatus for deriving quality data includes a processor and memory storing executable computer code causing the apparatus to at least perform operations including receiving a consistency check from a network device indicating a summary count obtained during a time period. The summary count specifies a number of data items of a service utilized/provided, within a given time period, to one or more communication devices of an entity. The consistency check also includes a raw count, obtained during a time window the expiration of which is subsequent to the time period, indicating a number of data items of the service utilized/provided, within the given time period, to the communication devices. The computer program code may further cause the apparatus to determine whether a deviation between the summary count relative to the raw count is less than or equal to a threshold. Corresponding methods and computer program products are also provided.

18 Claims, 10 Drawing Sheets

(56) References Cited

U.S. PATENT DOCUMENTS

| | | | | |
|---|---|---|---|---|
| 7,565,266 | B2 * | 7/2009 | Yam | G05B 23/0221 700/28 |
| 7,620,162 | B2 * | 11/2009 | Aaron | H04M 15/73 379/111 |
| 7,653,828 | B2 * | 1/2010 | Kostadinov | G06F 1/14 700/14 |
| 7,721,043 | B2 * | 5/2010 | Gill | G06F 12/0804 711/100 |
| 7,783,513 | B2 * | 8/2010 | Lee | G06Q 10/06398 705/7.42 |
| 8,015,291 | B2 * | 9/2011 | Chapman | G06Q 10/06375 709/226 |
| 8,156,075 | B2 * | 4/2012 | Greenwell | H04W 4/00 707/610 |
| 8,385,200 | B2 * | 2/2013 | Rainer | H04M 15/00 370/232 |
| 8,407,348 | B2 * | 3/2013 | Chapman | G06Q 10/06375 709/226 |
| 8,433,773 | B2 * | 4/2013 | Roney | G06F 11/0754 709/217 |
| 8,484,185 | B2 * | 7/2013 | Fra' | H04W 4/02 707/706 |
| 8,644,469 | B2 * | 2/2014 | Aaron | H04M 15/73 379/114.17 |
| 8,756,251 | B2 * | 6/2014 | Chodavarapu | G06Q 10/06 707/694 |
| 8,804,517 | B2 * | 8/2014 | Oerton | H04W 4/003 370/235 |
| 8,849,952 | B2 * | 9/2014 | Roney | G06F 11/0754 709/217 |
| 9,014,931 | B2 * | 4/2015 | Palmer | B60W 10/11 701/51 |
| 9,020,856 | B2 * | 4/2015 | Pastorelli | G06F 21/121 705/59 |
| 9,100,310 | B2 * | 8/2015 | Aaron | H04M 15/73 |
| 9,124,436 | B2 * | 9/2015 | Kashanian | H04L 12/1417 |
| 9,213,589 | B2 * | 12/2015 | Roney | G06F 11/0754 |
| 9,225,792 | B2 * | 12/2015 | Calippe | G06F 17/30902 |
| 9,295,915 | B2 * | 3/2016 | Bruno, Jr. | A63F 13/12 |
| 9,357,085 | B2 * | 5/2016 | Aaron | H04M 15/73 |
| 9,386,398 | B2 * | 7/2016 | Oerton | H04W 4/003 |
| 9,391,910 | B2 * | 7/2016 | Suzuki | H04L 49/15 |
| 9,426,308 | B2 * | 8/2016 | Bank | H04M 15/7652 |
| 9,432,832 | B2 * | 8/2016 | Bank | H04M 15/7652 |
| 9,495,526 | B2 * | 11/2016 | Hanna | G06F 21/32 |
| 9,671,237 | B1 * | 6/2017 | Eliassi | G01C 21/34 |
| 2007/0213030 | A1 * | 9/2007 | Benco | H04L 12/14 455/405 |
| 2007/0245420 | A1 * | 10/2007 | Yong | H04L 41/28 726/23 |
| 2010/0010837 | A1 * | 1/2010 | Lang | G06Q 10/10 705/4 |
| 2011/0137776 | A1 * | 6/2011 | Goad | G06Q 20/102 705/34 |
| 2013/0030960 | A1 * | 1/2013 | Kashanian | G06Q 30/02 705/27.1 |
| 2013/0069949 | A1 * | 3/2013 | Dembo | G06T 11/206 345/440 |
| 2013/0095787 | A1 * | 4/2013 | Kashanian | H04W 4/26 455/406 |
| 2013/0117140 | A1 * | 5/2013 | Kashanian | H04L 67/02 705/26.1 |
| 2013/0290224 | A1 * | 10/2013 | Crowns | G06N 99/005 706/12 |
| 2014/0149249 | A1 * | 5/2014 | Goad | G06Q 20/102 705/26.7 |
| 2015/0046301 | A1 * | 2/2015 | Wuerch | G06Q 40/12 705/30 |
| 2016/0223332 | A1 * | 8/2016 | Chesnutt | G01C 21/20 |
| 2016/0294569 | A1 * | 10/2016 | Chen | H04W 4/24 |
| 2016/0295028 | A1 * | 10/2016 | Chen | H04M 15/44 |

* cited by examiner

Automatic Quality Gate Status Table

| err_perc | <minErrThreshold> | <maxErrThreshold> | AQG decision |
|---|---|---|---|
| 0 | -5 | +5 | GOOD_COUNT |
| 2 | -5 | +5 | GOOD_COUNT |
| -5 | -5 | +5 | GOOD_COUNT |
| +5 | -5 | +5 | GOOD_COUNT |
| -6 | -5 | +5 | BAD_COUNT |
| +7 | -5 | +5 | BAD_COUNT |

Error Percentage Automatic Quality Gate Decision Making Table

FIG. 7

METHODS, APPARATUSES AND COMPUTER PROGRAM PRODUCTS TO DERIVE QUALITY DATA FROM AN EVENTUALLY CONSISTENT SYSTEM

TECHNOLOGICAL FIELD

An example embodiment of the invention relates generally to deriving quality data provided by one or more services to communication devices and more particularly, relates to a method, apparatus, and computer program product for checking the quality of data and ensuring that the quality of the data meets an acceptable level.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to services providing data for usage by communication devices. These services may be utilized to determine current locations of communication devices in the real-world, or to provide maps or driving directions as well as provide other suitable features to communication devices. The usage of the data of these services by communication devices may be acquired for billing purposes.

At present, data provided to communication devices for utilizing services may be detected and reported by a communications system. As such, the communications system may receive large amounts of data from various communication devices for using services. Currently, in an instance in which a discrepancy is identified in the actual data utilized by a service(s) of a communication device(s) and data that was detected/identified as being utilized by a service(s) of a communication devices(s), a task may need to be scheduled to obtain good/accurate data and/or correct errors in erroneous/bad data (e.g., corrupt data, missing data, etc.). One example of bad data may be data that is lost or untimely submitted to a communications system for evaluation. For instance, there may be an instance in which data pertaining to usage of a service(s) arrives later at the communications system than initial data for usage of the same service(s) was originally detected by the communications system which may result in data discrepancies.

To address this problem of rectifying discrepancies in large amounts of data, at present, multiple systems typically may be involved in an end-to-end transaction that may span a multitude of organizational boundaries. For instance, to rectify the discrepancies in data different combinations of notification, ticketing and manual intervention may need to be utilized to rectify the discrepancies in data.

Given the large volume of data and the multiple systems involved, these existing techniques of reconciling data discrepancies of services provided to communication devices are typically time consuming and laborious which may constrain processing capacity and bandwidth of communication devices as well as may constrain memory capacity of memory devices. These existing techniques are also typically expensive to implement.

In view of the foregoing drawbacks, it may be beneficial to provide a reliable mechanism of more efficiently resolving data discrepancies pertaining to data usage of services of communication devices.

BRIEF SUMMARY

A method, apparatus and computer program product are therefore provided for deriving quality usage data pertaining to usage or receipt of data provided via one or more services to one or more communication devices. In this regard, an example embodiment may ensure that good quality data associated with usage of a service(s) (e.g., a mapping service application, a driving direction service application, etc.) is received and utilized for determining corresponding billing data that may be reported to an entity at any point in time.

An example embodiment may facilitate receipt and analysis of service usage data pertaining to data generated for one or more services (e.g., a mapping service application, a driving direction service application, etc.) of communication devices received from one or more network entities (e.g., nodes) that may be globally distributed. In this regard, indications of the data pertaining to the service(s) provided to a communication device(s) may be forwarded by respective network entities to a network device (e.g., a summary indexer device). As such, an example embodiment may enable usage of summary counts of content pertaining to data of one or more services provided to one or more communication devices that are calculated on a periodic (e.g., hourly) basis. In this regard, an example embodiment may compare or validate a summary count(s) of the service usage data against one or more items of raw data (e.g., raw log data (also referred to herein as raw logs)) pertaining to the services usage data provided to a communication device(s) over a period of time (e.g., an entire day).

In an example embodiment, the raw data may be the original data pertaining to the services of usage data in which some of the raw data may be received some time period (e.g., over the course of an entire day (e.g., 12:00 AM-12:00 PM)) after a summary count (e.g., an hourly count) of the service usage data is calculated. In this regard for example, in some instances, the summary count of the service usage data may be different than the raw log data for a given time period (e.g., 10:00 AM-11:00 AM). For example, additional service usage data for the given time period (e.g., 10:00 AM-11:00 AM) may be detected at a later time or time period (e.g., 5:00 PM) by an example embodiment. For instance, a network entity (e.g., a node) may report the additional service usage data to a network device of an example embodiment in an untimely fashion or the identification/detection of the additional service usage data for the given time period (e.g., 10:00 AM-11:00 AM) may have been delayed by the network entity prior to reporting the additional service usage data to the network device, or for any other suitable reasons.

In an instance in which the deviation of the summary count of the service usage data in comparison to the raw log data for a given time period (e.g., 10:00 AM-11:00 AM) is less than or equal to a predetermined threshold (e.g., ±5%), an example embodiment may ingest or receive the service usage data associated with the summary count such as, for example, from a network entity to calculate billing data corresponding to the service usage data of the summary count. In other words, the service usage data associated with the summary count may be analyzed by a network device of an example embodiment to determine the appropriate billing data that an entity (e.g. a consumer/user, an enterprise group, etc.) owes for receiving/utilizing the data of a service (e.g., a mapping service application, a direction service application, etc.).

On the other hand, in an instance in which the deviation of the summary count of the services usage data in comparison to the raw log data for the given time period (e.g., 10:00 AM-11:00 AM) exceeds the predetermined threshold (e.g., ±5%), an example embodiment may generate and send an automatic notification(s) indicating that the data quality of the service usage data of the summary count failed or is not met. In one example embodiment, a network device may generate the notification(s) in the form of a ticket(s). The notification(s) (e.g., a ticket(s)) may be provided by a network device of an example embodiment to a network entity that maintains and stores the items of raw data corresponding to the service usage data. The notification(s) may instruct the network entity to recalculate the summary count after a time window in which the initial summary count was calculated (e.g., 24 hours from the initial summary count calculation) for service usage data pertaining to a given time period (e.g., 10:00 AM-11:00 AM). In this regard, the recalculated summary count may be more complete or accurate since the raw data corresponding to the service usage data stored by the network entity may be more complete/accurate (e.g., additional service usage data pertaining to the time period may be received) at a subsequent time (e.g., 24 hours later) than the initial summary count was performed.

In response to receipt of the recalculated summary count of service usage data, a network device of an example embodiment may determine whether the deviation of the recalculated summary count of the services usage data in comparison to raw log data is less than or equal to the predetermined threshold (e.g., ±5%). In an instance, in which the deviation is less than or equal to the predetermined threshold, a network device of an example embodiment may receive the service usage data associated with the recalculated summary count from a network entity in order to determine billing data of an entity for utilizing or being provided the service usage data (e.g., data for using a service such as, for example, a mapping service application).

On the other hand, in an instance in which the recalculated summary count in comparison to the raw log data still exceeds the predetermined threshold, the process is repeated and another recalculated summary count is performed until the summary count of the service usage data in comparison to the raw log data for a given period of time is less than or equal to the predetermined threshold (e.g., ±5%).

Since a recalculated summary count of service usage data may be based on more accurate/complete raw log data at a time subsequent (e.g., a next day, 24 hours later, etc.) to an initial calculation of the summary count such that the deviation between summary count and raw log data for a particular time period (e.g., 10:00 AM-11:00 AM) becomes less than or equal to a predetermined threshold (e.g., ±5%), an example embodiment may consistently derive quality data from an eventually consistent system (e.g., the raw data received by a network device becomes more consistent over time).

In this regard, an example embodiment provides techniques that may ensure that high quality data (e.g., data utilized or provided via a service to a communication device(s)) is received in order to determine corresponding billing data from the high quality data. As such, an example embodiment may provide higher confidence in reporting billing data to one or more entities (e.g., consumers/users, corporate enterprises (e.g., vehicle manufacturers, etc.). Additionally, an example embodiment may drastically reduce the time and effort required to correct data discrepancies. For example, by utilizing and analyzing a summary count of service usage data that is determined periodically (e.g., every hour), an example embodiment may provide technical solutions to problems of resolving data discrepancies and may drastically reduce the time and effort required to correct data discrepancies since large volumes of complete raw data over the course of a time period (e.g., an entire day) need not be considered in all instances.

In this manner, by utilizing techniques of an example embodiment to drastically reduce the time and effort required to correct data discrepancies, the processing capacity and bandwidth capacity of devices (e.g., communication devices, network devices, etc.) as well as the storage capacity of memory devices may be conserved which improves the functioning of the devices. Additionally, utilizing techniques of an exemplary embodiment saves a lot of time and effort in reporting billing quality data for high volume service application(s) (e.g., application programming interface (API)) transactions.

In one example embodiment, a method for deriving quality data is provided. The method may include receiving a consistency check from a network device indicating a summary count obtained during a predetermined time period. The summary count specifies a number of items of data of a respective service utilized or provided, within a given time period, to one or more communication devices of an entity and a raw count, obtained during a predefined time window the expiration of which is subsequent to the predetermined time period. The raw count indicates a number of items of data of the respective service utilized or provided, within the given time period, to the communication devices. The method may also include determining whether a deviation between the summary count in relation to the raw count is less than or equal to a predetermined threshold.

In another example embodiment, an apparatus for deriving quality data is provided. The apparatus may include a processor and a memory including computer program code. The memory and the computer program code are configured to, with the processor, cause the apparatus to at least perform operations including receiving a consistency check from a network device indicating a summary count obtained during a predetermined time period. The summary count specifies a number of items of data of a respective service utilized or provided, within a given time period, to one or more communication devices of an entity and a raw count, obtained during a predefined time window the expiration of which is subsequent to the predetermined time period. The raw count indicates a number of items of data of the respective service utilized or provided, within the given time period, to the communication devices. The memory and computer program code are also configured to, with the processor, cause the apparatus to determine whether a deviation between the summary count in relation to the raw count is less than or equal to a predetermined threshold.

In another example embodiment, a computer program product for deriving quality data is provided. The computer program product includes at least one computer-readable storage medium having computer-readable program code portions stored therein. The computer-executable program code instructions may include program code instructions configured to cause receipt of a consistency check from a network device indicating a summary count obtained during a predetermined time period. The summary count specifies a number of items of data of a respective service utilized or provided, within a given time period, to one or more communication devices of an entity and a raw count, obtained during a predefined time window the expiration of which is subsequent to the predetermined time period. The raw count indicates a number of items of data of the respective service utilized or provided, within the given time period, to the communication devices. The program code instructions may also determine whether a deviation between the summary count in relation to the raw count is less than or equal to a predetermined threshold.

In yet another example embodiment, an apparatus for deriving quality data is provided. The apparatus may include means for receiving a consistency check from a network device indicating a summary count obtained during a predetermined time period. The summary count specifies a number of items of data of a respective service utilized or provided, within a given time period, to one or more communication devices of an entity and a raw count, obtained during a predefined time window the expiration of which is subsequent to the predetermined time period. The raw count indicates a number of items of data of the respective service utilized or provided, within the given time period, to the communication devices. The apparatus may also include means for determining whether a deviation between the summary count in relation to the raw count is less than or equal to a predetermined threshold.

BRIEF DESCRIPTION OF THE SEVERAL VIEWS OF THE DRAWINGS

Figure 1:
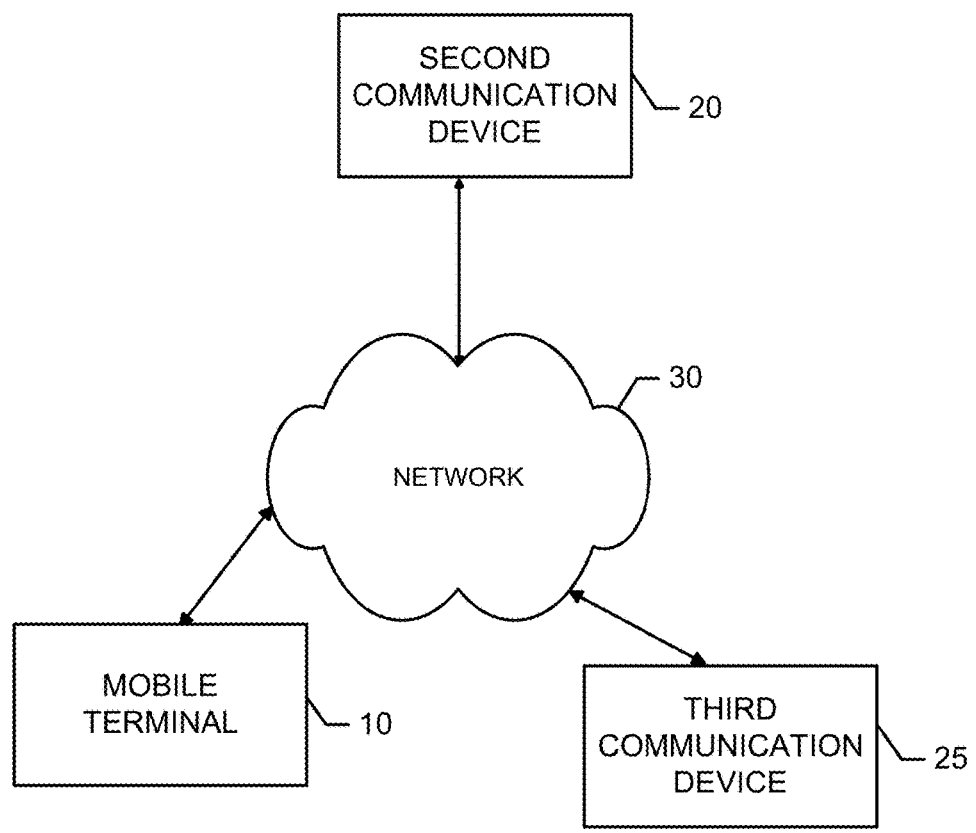
Figure 2:
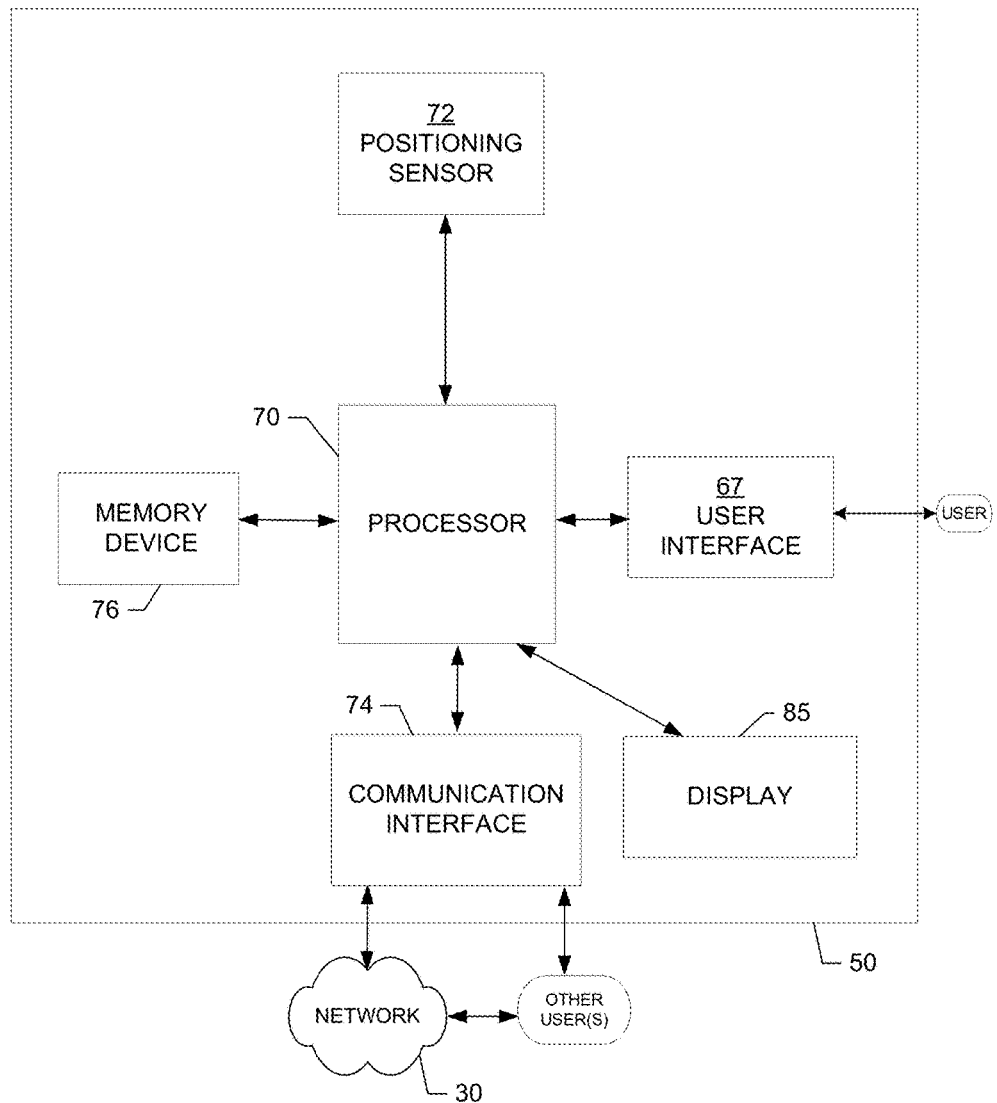
Figure 3:
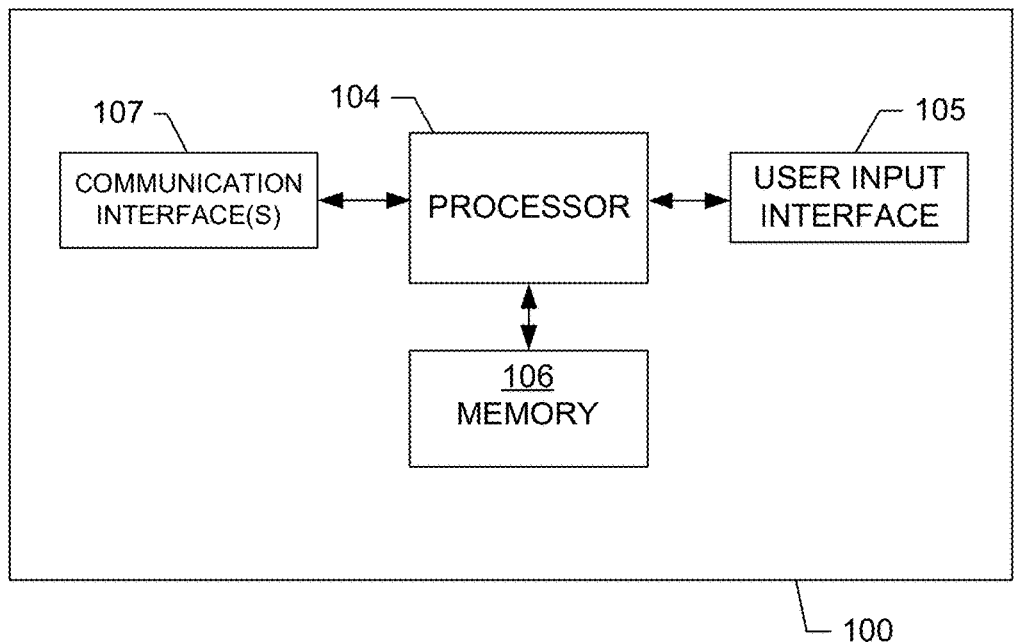
Figure 4:
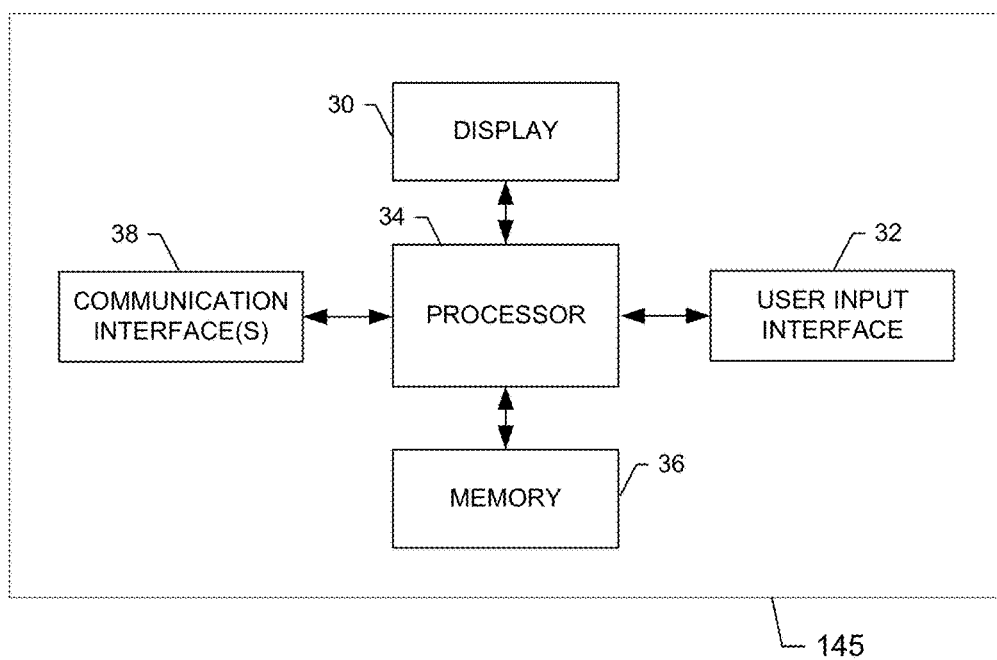
Figure 5:
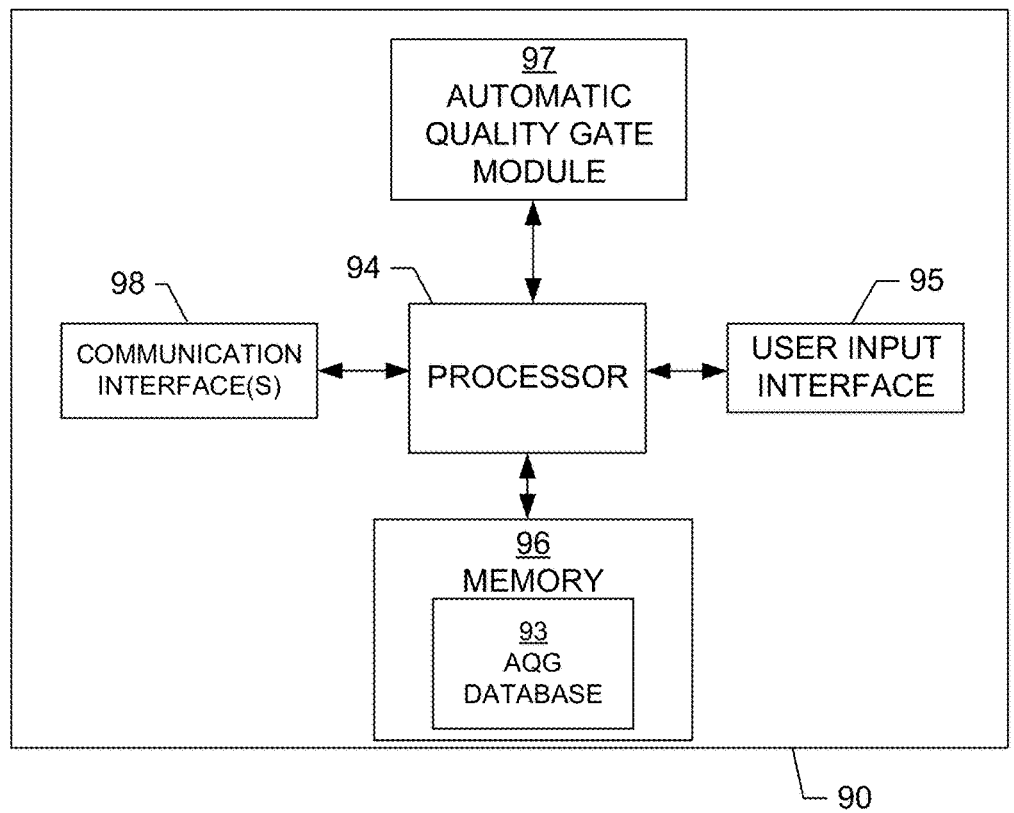
Figure 6:
Figure 8:
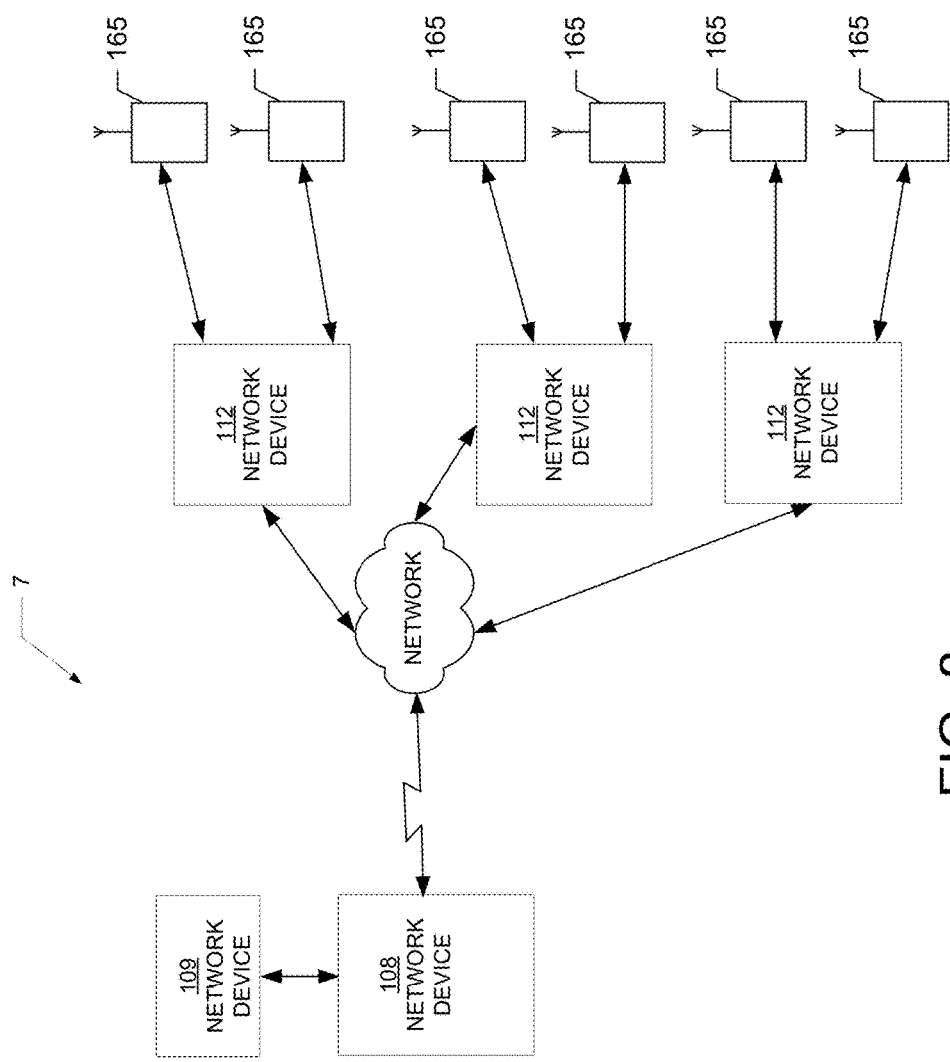
Figure 9A:
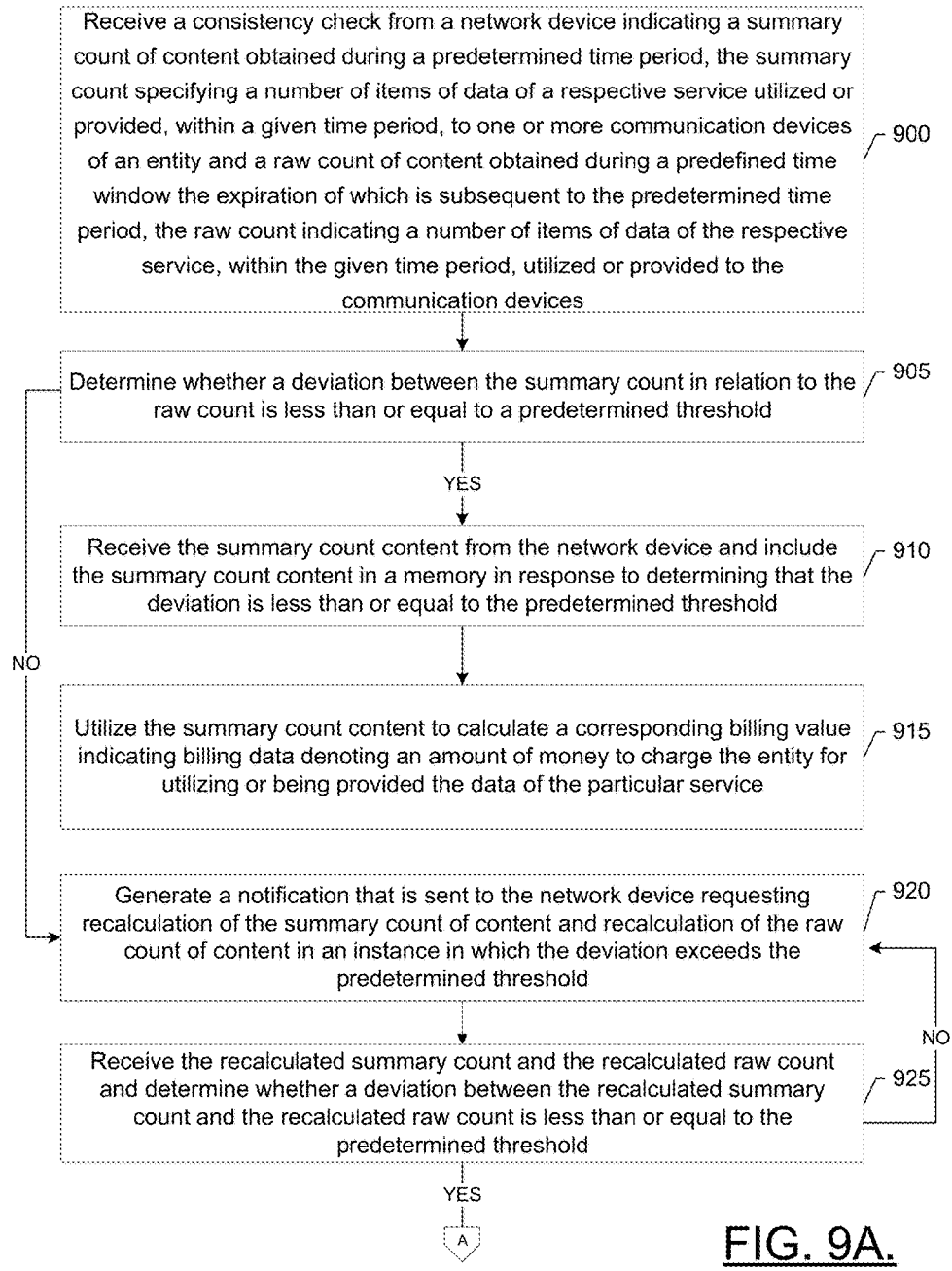
Figure 9B:
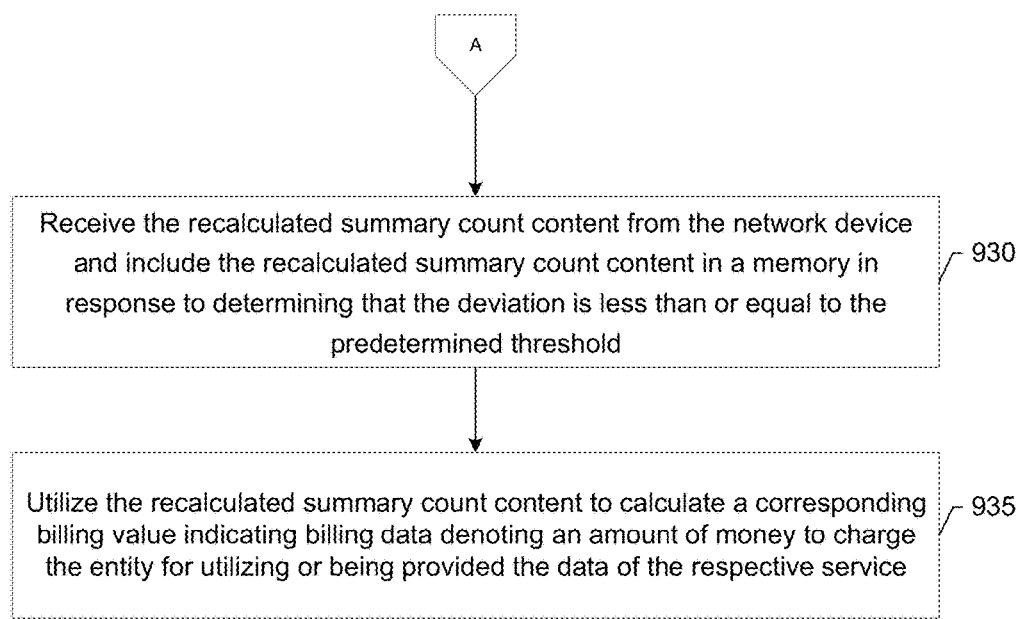

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a network entity according to an example embodiment of the invention;

FIG. 4 is a schematic block diagram of a network indexer according to an example embodiment of the invention;

FIG. 5 is a schematic block diagram of a network device according to an example embodiment of the invention;

FIG. 6 is a diagram of an automatic quality gate status table according to an example embodiment of the invention;

FIG. 7 is a diagram of an error percentage automatic quality gate decision making table according to an example embodiment of the invention;

FIG. 8 is a block diagram of a system according to an example embodiment of the invention; and FIG. 9A and FIG. 9B are diagrams of flowcharts of an example method of deriving quality data according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, and a positioning sensor 72. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may also store data (e.g., map data, driving directions data, traffic data, etc.) received from or for accessing/utilizing one or more service applications (e.g., a mapping service application, a direction service application, a traffic service application, etc.).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Hypertext Transfer Protocol (HTTP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In addition, the apparatus 50 may include a positioning sensor 72. The positioning sensor 72 may be any means such as a device or circuitry embodied in either hardware or a combination of hardware and software (e.g., processor 70 operating under software control, the processor 70 embodied as an ASIC or FPGA specifically configured to perform the operations described herein, or a combination thereof) that is configured to determine the speed, velocity or acceleration of the apparatus 50 as well as a position(s) or location(s) of the apparatus 50. In this regard, the positioning sensor 72 may indicate the location of the apparatus and one or more other points of interest (e.g., icons) on a map. In an example embodiment, the map provided by the positioning sensor may show traffic and may indicate one or more traffic routes or route directions (e.g., driving directions, walking directions, etc.). The positioning sensor 72 may determine the speed and acceleration in which the apparatus 50 is moving or traveling along a path or route, for example through timed location updates. For instance, the positioning sensor 72 is configured to determine the speed and acceleration in which the apparatus 50 is traveling based on changes in position at respective times. In this regard, the positioning sensor 72 is configured to determine the time that it takes the apparatus 50 to move from a first location to a second location in order to determine the speed in which the apparatus 50 is moving or travelling. In an example embodiment, the positioning sensor 72 may include a motion detection unit (e.g., an accelerometer, a gyrometer with associated algorithms) for obtaining the speed in which the apparatus 50 is traveling or moving.

Additionally, the positioning sensor 72 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory (e.g., memory device 76) of the apparatus 50 or to another memory device to be stored as a position history or location information. In this regard, for example, the position history may define a series of data points corresponding to positions or locations of the apparatus 50 at respective times. Various events or activities of the apparatus 50 may also be recorded in association with position history or location information provided by the positioning sensor 72.

In some example embodiments, the positioning sensor 72 may be an application program interface (API) that provides one or more selectable services such as, for example, a mapping service application, a traffic service application, a direction service application (e.g., a driving directions service, a walking directions service, etc.) or any other suitable geocoding or geolocation service. In this regard, in response to receipt of an indication of a selection (e.g., a selection via a user of the apparatus 50) of the positioning sensor 72 and selection of a service(s) provided by the positioning sensor 72, the positioning sensor 72 may detect a location of the apparatus 50 and may provide the location in a request for data associated with the selected service (e.g., the mapping service application) to a network entity (e.g., network entity 100 of FIG. 3).

In response, the network entity may provide the data (e.g., map features) for the selected service (e.g., the mapping service) to the apparatus 50. In this regard, the network entity may maintain and store a log(s) of the data being provided for usage of the requested service (e.g., the mapping service application) to the apparatus 50. The log(s) may include data indicating a timestamp specifying the time in which the data for usage of the service (e.g., the mapping service application) was provided to the apparatus 50 by the network entity as well as an application ID (e.g., map app 123, etc.) of the application making the request and any other suitable data. As described more fully below, the service data utilized (also referred to herein as service usage data) and provided to the apparatus 50 by the network entity may be utilized to determine corresponding billing data for usage of the service data being provided to the apparatus 50.

Referring now to FIG. 3, a block diagram of an example embodiment of a network entity is provided. As shown in FIG. 3, the network entity (e.g., a server (e.g., communication device 20)) generally includes a processor 104 and an associated memory 106. The memory 106 may comprise volatile and/or non-volatile memory, and may store content, data and/or the like. The memory 106 may store client applications, instructions, and/or the like for the processor 104 to perform the various operations of the network entity 100. In addition, the memory 106 may store one or more logs of the data being provided for usage of a requested service (e.g., a mapping service application) to one or more communication devices (e.g., apparatuses 50).

The processor 104 may also be connected to at least one communication interface 107 or other means for displaying, transmitting and/or receiving data, content, and/or the like. The user input interface 105 may comprise any of a number of devices allowing the network entity 100 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The network entity 100 may receive one or more requests from one or more communications devices (e.g., apparatuses 50) to provide data (e.g., map data, traffic data, directions data, etc.) for a requested service(s) (e.g., a mapping service application, a traffic service application, a direction service application, etc.).

The processor 104 of the network entity 100 may generate one or more logs that may include data indicating a timestamp specifying the time in which the requested data for usage of the service (e.g., the mapping service application) was provided to a communication device(s) (e.g., apparatus(es) 50) by the network entity 100 as well as an application ID (e.g., map app 123, etc.) of the service application (e.g., the mapping service application) making the request and any other suitable data.

Additionally, the processor 104 of the network entity 100 may periodically (e.g., hourly) provide the logs of data to a network indexer device (e.g., network indexer device 145 of FIG. 4) to enable the network indexer device to aggregate and collect the logs and to determine summary counts of the data for a particular service (e.g., a mapping service) for a particular time period (e.g., 10:00 AM-11:00 AM of a given day). The summary count(s) may include a count of the items of data that were utilized or provided to one or more communication devices of an entity (e.g., a consumer/user of a communication device, a corporate enterprise (e.g., automotive manufacturers having a plurality of communication devices, etc.)) for usage of data of a particular service (e.g., a mapping service application) for a given time period (e.g., 10:00 AM-11:00 AM), as described more fully below.

Referring now to FIG. 4, a block diagram of one example of a network indexer device is provided. In one example embodiment, the network indexer device 145 (also referred to herein as network indexer 145) may periodically receive logs during predetermined time periods (e.g., hourly) from one or more network entities (e.g., network entities 100). As pointed out above, the logs may include data indicating a timestamp specifying the time in which requested data for usage of a service (e.g., the mapping service application) was provided to a communication device(s) (e.g., apparatus(es) 50) by one or more network entities (e.g., network entity 100) as well as an application ID (e.g., map app 123, etc.) of the service (e.g., the mapping service application) making the request and any other suitable data.

In this regard, the network indexer 145 may capture, aggregate, correlate and index log data (e.g., raw (e.g., original) log data) in a searchable memory device (e.g., memory 36). As shown in FIG. 4, the network indexer (e.g., a server (e.g., communication device 20)) generally includes a processor 34 and an associated memory 36. The memory 36 may comprise volatile and/or non-volatile memory, and may store content, data (e.g., log data) and/or the like. For example, the memory may store content, data, information, and/or the like transmitted from, and/or received by, the network indexer. Also for example, the memory 36 may store client applications, instructions, and/or the like for the processor 34 to perform the various operations of the network indexer in accordance with an embodiment of the invention, as described herein. The memory 36 may store original logs for various time periods (e.g., various different days) received from various network entities (e.g., network entities 100).

In addition to the memory 36, the processor 34 may also be connected to at least one interface or other means for displaying (e.g., display 30), transmitting and/or receiving data, content, and/or the like. In this regard, the interface(s) may comprise at least one communication interface 38 or other means for transmitting and/or receiving data, content, and/or the like, as well as at least one user input interface 32. The user input interface 32, in turn, may comprise any of a number of devices allowing the network device to receive data from a user, such as a keypad, a touch display, a joystick or other input device. In this regard, the processor 34 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The processor 34 of the network indexer 145 may calculate summary counts of items of log data for a given time period (e.g., hourly (e.g., 10:00 AM-11:00 AM)) pertaining to corresponding services. For example, the processor 34 of the network indexer 145 may calculate the summary count of a number of data items for a time period (e.g., 10:00 AM-11:00 AM) pertaining to the data usage of a particular service (e.g., a mapping service application) provided to a communication device(s) (e.g., an apparatus(es) 50) of an entity. As another example, the processor 34 of the network device 145 may calculate the summary count of a number of data items for a time period (e.g., 1:00 PM-2:00 PM) pertaining to the data usage of another service(s) (e.g., a driving service application) provided to a communication device(s) (e.g., an apparatus(es) 50) of an entity, so on and so forth. In this regard, the processor 34 may calculate a summary count on a periodic basis of the actual number of items of data utilized or provided to a communication device(s) (e.g., apparatus(es) 50) for a particular service during a given time period.

In response to receipt of a request from a network device (e.g., network device 90 of FIG. 5), the processor 34 of the network indexer 145 may provide a summary count and corresponding raw data to network device to enable the network device to determine whether a deviation between the summary count and the raw data for a given time period is less than or equal to a predetermined threshold (e.g., ±5%).

As pointed out above, the network indexer 145 may periodically receive logs during predetermined time periods (e.g., hourly) from one or more network entities. However, in some instances, the processor 34 of the network indexer 145 may receive log data corresponding to usage data generated during a given time period (e.g., 10:00 AM-11:00 AM) for a particular service (e.g., a mapping service application) after a periodic predetermined time period (e.g., after a designated hour time period) such as, for example, at the end of a day. For instance, receipt of these logs may be delayed by a network entity (e.g., network entity 100) sending the logs or for any other suitable reasons. As such, in an instance in which a summary count for a given time period in comparison with raw log data for the given time period (e.g., 10:00 AM-11:00 AM on August $20^{th}$) exceeds the predetermined threshold (e.g., ±5%), the processor 34 of the network indexer 145 may receive a request or notification (e.g., a ticket) to recalculate the summary count for the given time period which may include the usage data for the particular service (e.g., a mapping service application) at a time (e.g., 24 hours later (e.g., 10:00 AM-11:00 AM on August $21^{st}$)) subsequent to the initial time period (e.g., 10:00 AM-11:00 AM on August $20^{th}$) in which the initial summary count was performed. As such, since the summary count data may be more accurate in this example by including data for the service obtained at a subsequent time period from when the initial summary count was performed, the deviation of the recalculated summary count to the corresponding raw data for the given time period (e.g., 10:00 AM-11:00 AM on August $20^{th}$) may be less than or equal to the predetermined threshold (e.g., ±5%). It should be pointed out that in an example embodiment, the notification to recalculate the summary count may be hooked to a triggering mechanism that initiates backfill and auto-corrects the data without any manual intervention.

In an instance in which the deviation of the summary count to the corresponding raw data for the given time period is less than or equal to the predetermined threshold (e.g., ±5%), the network device (e.g., network device 90 of FIG. 5) may determine that the data may be utilized to calculate corresponding billing data from the summary count data, as described more fully below.

Referring now to FIG. 5, a block diagram of one example of a network device for deriving quality data is provided according to an example embodiment. As shown in FIG. 5, the network device (e.g., a server (e.g., communication device 25)) generally includes a processor 94 and an associated memory 96. The memory 96 may comprise volatile and/or non-volatile memory, and may store content (e.g., summary count data, raw count data, etc.), data and/or the like. For example, the memory may store content, data, information, and/or the like transmitted from, and/or received by, the network device. Also for example, the memory 96 may store client applications, instructions, and/or the like for the processor 94 to perform the various operations of the network device in accordance with an embodiment of the invention, as described herein. The memory 96 may include an automatic quality gate (AQG) database 93. The AQG database 93 may include an automatic quality gate status table 91, as shown for example in FIG. 6, which may include data indicating a summary count (e.g., summary_count) of data utilized or provided for a particular service(s) (e.g., a mapping service application) during a given time period, and a raw count (e.g., raw_count) of data utilized or provided for the same particular service(s) during the given time period. The automatic quality gate status table 91 may also include data specifying a value of an error percentage (e.g., error_percentage) (also referred to herein as err_perc) indicating a deviation between the summary count in comparison to the raw count for the particular service(s) as well as other suitable data.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the automatic quality gate (AQG) module 97. The AQG module 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the AQG module 97, as described below. Thus, in an example in which software is employed, a device or circuitry (e.g., the processor 94 in one example) executing the software forms the structure associated with such means.

The AQG module 97 may send a request to the network indexer 145 to receive a summary count(s) and a raw count(s) of data for a particular service utilized or provided to one or more communication devices (e.g., apparatuses 50) for a given time period. The raw count of data for the particular service provided to one or more communication devices for the given time period (e.g., 10:00 AM to 11:00 AM) may be based on data utilized/provided for the given time period (e.g., 10:00 AM to 11:00 AM) for the particular service but for which is identified and received by the network device 145 over the course of a longer time period (e.g., over the course of an entire day (e.g., from 12:00 AM to 12:00 PM)) than the time period (e.g., between 10:00 AM to 11:00 AM) in which the summary count of the data is obtained by the network indexer 145. In this regard, in some instances the raw count of data may correspond to a higher count of data utilized/provided for the particular service by a communication device(s) for the time period since there is a longer time period to obtain the data for the raw count.

Upon receipt of the requested summary count(s) and the requested raw count(s) of the items of data for the particular service utilized or provided to one or more communication, the AQG module 97 of the network device 90 may determine whether a deviation between the summary count and the raw count for the particular service for the given time period (e.g., 10:00 AM-11:00 AM) is less than or equal to a predetermined threshold (e.g., ±5%). In an instance in which the AQG module 97 determines that the deviation between the summary count and the raw count is less than or equal to the predetermined threshold, the AQG module 97 may request the corresponding summary count content (e.g., data utilized or provided pertaining to a respective service) from the network indexer 145. In response to receipt of the summary count content by the AQG module 97 from the network indexer 145, the AQG module 97 may ingest or include the summary count content in the AQG database 93 and may update a status in the AQG status table 91 to indicate "Success". In addition, the AQG module 97 may utilize the summary count content to calculate corresponding billing data to charge an entity (e.g., a consumer/user, a corporate entity) for utilizing or being provided the data for the particular service during the given time period (e.g., 10:00 AM-11:00 AM), as described more fully below. The AQG module 97 may also utilize the summary count content for usage reporting pertaining to reporting usage data for a particular service(s) and/or performing other analytics on the summary count content (e.g., analyzing the summary count content for trends, etc.).

On the other hand, in an instance in which the AQG module 97 of the network device 90 determines that a deviation between the summary count and the raw count for the particular service for the given time period (e.g., 10:00 AM-11:00 AM) exceeds the predetermined threshold (e.g., ±5%) (e.g., in an instance in which the error percentage is −6, +7, as shown, for example, in the error percentage AQG decision making table of FIG. 7), the AQG module 97 may generate a notification (e.g., a ticket) and may request the network device 145 to recalculate the summary count, as described more fully below.

Referring now to FIG. 8, an example embodiment of a system for deriving quality data is provided. The system 7 may include communication devices 165 (e.g., apparatuses 50), network devices 112 (e.g., network entities 100), a network device 108 (e.g., network indexer 145), and a network device 109 (e.g., network device 90).

Although FIG. 8 shows six communication devices, three network devices 112, one network device 108 and one network device 109, it should be pointed out that any suitable number of communication devices 165, network devices 112, network devices 108 and network devices 109 may be part of the system 7 without departing from the spirit and scope of the invention.

In the example embodiment of FIG. 8, the communication devices 165 may access or select an application for a service (e.g., a mapping service application, etc.) to request receipt of and utilize data of the service. The receipt may be sent to one or more corresponding network devices 112. As such, the network devices 112 may send the communication devices 165 the data (e.g., map data (e.g., a HERE™ map)) of the service. In addition, the network devices 112 may generate logs indicating the data for a given time period (e.g., 10:00 AM-11:00 AM) in which the data was provided to one or more respective communication devices 165.

The network devices 112 may periodically (e.g., hourly) send the logs to the network device 108 and the network device 108 may generate one or more summary counts for respective services (e.g., a mapping service application, a driving service application, a traffic service application, etc.) and may also maintain and store raw log data pertaining to the services. A processor (e.g., processor 34) of the network device 108 may perform a consistency check and determine/calculate summary counts during a predetermined periodic time period (e.g., hourly) for respective services. The processor of the network device 108 may also perform the consistency check to determine/calculate raw counts for respective services. In this regard, the raw counts may be calculated by the processor (e.g., processor 34) of the network device 108 based on the aggregated data determined to be utilized and/or provided to one or more communication devices 165 for the respective services in which the aggregated data is obtained during a predetermined time period (e.g., for the entire day (e.g., 12:00 AM-12:00 PM)).

In response to receipt of a request from the network device 109 (e.g., network device 90), the processor (e.g., processor 34) of the network device 108 (e.g., network indexer 145) may send the network device 109 a summary count and a raw count for a particular service (e.g., a mapping service application) for data utilized or provided to one or more communication devices 165 for a given time period (e.g., 10:00 AM-11:00 AM).

In response to receipt of the summary count and the raw count, an AQG module (e.g., AQG module 97) of the network device 109 may determine whether a deviation between the summary count in relation to or comparison to the raw count is less than or equal to a predetermined threshold (e.g., ±5%). In an instance in which the AQG module of the network device 109 determines that the deviation between the summary count in comparison to the raw count is less than or equal to the predetermined threshold, the AQG module may update a status for the summary count as "Success" in an automatic quality gate status table (e.g., automatic quality gate status table 91). In addition, the AQG module of the network device 109 may request the data corresponding to the summary count from the network device 108 and upon receipt of the data the AQG module may ingest or include the data in an AQG database (e.g., AQG database 93) such that the AQG module may use the data determine corresponding billing data. In this regard, the AQG module may use the data to determine a billing value (e.g., a billing amount to charge an entity for the data of the particular service (e.g., a mapping service application).

On the other hand, in an instance in which the AQG module of the network device 109 determines that the deviation between the summary count in comparison to the raw count exceeds the predetermined threshold, the AQG module may update in the automatic quality gate status table that the summary count is a "Bad Count". In addition, the AQG module of the network device 109 may generate a notification (e.g., a ticket) that is sent to the network device 108 requesting the processor of the network device 108 to recalculate the summary count from the original raw log data. In an example embodiment, the processor of the network device 108 may recalculate the summary count from the original raw log data after a predetermined time period (e.g., the next day of the week, 24 hours later, etc.) from which the initial summary count was determined. In this regard, the recalculated summary count content may be more accurate than the initial summary count content since the recalculated summary count content may include additional data pertaining to the time period (e.g., 10:00 AM-11:00 AM) being considered, for the particular service, that may be received or identified by the processor of the network device 108 at a time subsequent (e.g., the next day, 24 hours later, etc.) to the time period of the determination of the initial summary count.

The processor of the network device 108 may provide the recalculated summary count and the recalculated raw count to the AQG module of the network device 109. In this regard, the AQG module may determine if the deviation between the recalculated summary count and the recalculated raw count is less than or equal to the predetermined threshold. In an instance in which the AQG module of the network device 109 determines that the deviation between the recalculated summary count in comparison to the recalculated raw count is less than or equal to the predetermined threshold, the AQG module may request the content corresponding to the recalculated summary count from the network device 108. Upon receipt of the content, the AQG module may ingest or include the content in an AQG database (e.g., AQG database 93). In response to (e.g., after) the AQG module detecting that the content is successfully ingested or included in the AQG database (e.g., AQG database 93), the AQG module may update a status as "SUCCESS" in the automatic quality gate status table (e.g., automatic quality gate status table 91) such that the AQG module may use the content to determine corresponding billing data to charge an entity (e.g., a consumer/user, corporate enterprise, etc.) for usage of the content.

On the other hand, in an instance in which the deviation between the recalculated summary count and the recalculated raw count still exceeds the predetermined threshold, the AQG module may repeat the process and may generate another notification (e.g., ticket) and request the processor of the network device 108 to perform another recalculation of the summary count and another recalculation of the raw count until the AQG module determines that the deviation between this additional recalculation of the summary count and this additional recalculation of the raw count is less than or equal to the predetermined threshold.

The AQG module may repeat this process for each and every (e.g., previously) failed service(s). In an instance in which the AQG module detects any state other than "SUCCESS" for any service(s) on previous runs (e.g., days), the AQG module may start processing content again until the state turns to "SUCCESS" to achieve eventually consistent data.

Referring now to FIGS. 9A and 9B, a flowchart for deriving quality data is provided according to an example embodiment. At operation 900, an apparatus (e.g., network device 109 (e.g., network device 90)) may receive a consistency check from a network device (e.g., network device 109 (e.g., network indexer 145)) indicating a summary count of content obtained during a predetermined time period (e.g., during a particular hour). The summary count specifies a number of items of data of a respective service (e.g., a mapping service application, etc.) utilized or provided, within a given time period (e.g., 10:00 AM-11:00 AM of a given day), to one or more communication devices (e.g., communication devices 165 (e.g., apparatuses 50)) of an entity and a raw count of content obtained during a predefined time window (e.g., over the course of an entire day (e.g., 12:00 AM-12:00 PM)) the expiration of which is subsequent to the predetermined time period indicating a number of items of data of the respective service utilized or provided, within the given time period, to the communication devices.

At operation 905, the apparatus (e.g., network device 109 (e.g., network device 90)) may determine whether a deviation between the summary count in relation or comparison to the raw count is less than or equal to a predetermined threshold (e.g., ±5%). At operation 910, the apparatus (e.g., network device 109 (e.g., network device 90)) may receive the summary count content (e.g., data associated with the respective service) from the network device (e.g., network device 109 (e.g., network indexer 145)) and may include or ingest the summary count content in a memory (e.g., a database (e.g., AQG database 93)) in response to determining that the deviation is less than or equal to the predetermined threshold. In this regard, the apparatus (e.g., network device 109 (e.g., network device 90)) may also include data in a table (e.g., an AQG status table 91) indicating that a status of the summary count content is a "Success". In an example embodiment, indicating that the summary count content is a "Success" by the apparatus denotes that the quality of the summary count content meets an acceptable level.

At operation 915, the apparatus (e.g., network device 109 (e.g., network device 90)) may utilize the summary count content to calculate a corresponding billing value indicating billing data denoting an amount of money, owed by or, to charge the entity (e.g., a consumer/user, a corporate enterprise, etc.) for utilizing or being provided the data of the respective service (e.g., a mapping service application).

On the other hand, at operation 920, the apparatus (e.g., network device 109 (e.g., network device 90)) may generate a notification (e.g., a ticket) that is sent to the network device (e.g., network device 108 (e.g., network indexer 145)) requesting recalculation of the summary count of content and recalculation of the raw count of content in an instance in which the deviation between the initial summary count content and the initial raw count content exceeds the predetermined threshold (e.g., ±5%). In this regard, the apparatus (e.g., network device 109 (e.g., network device 90)) may also include data in a table (e.g., an AQG status table 91) indicating that a status of the initial summary count content is a "Bad Count". In an example embodiment, indicating that the initial summary count content is a "Bad Count" by the apparatus denotes that the quality of the initial summary count content does not meet an acceptable level.

At operation 925, the apparatus (e.g., network device 109 (e.g., network device 90)) may receive the recalculated summary count and the recalculated raw count from the network device (e.g., network device 198 (e.g., network indexer 145)) and may determine whether a deviation between the recalculated summary count and the recalculated raw count is less than or equal to the predetermined threshold. In one example embodiment, the recalculated summary count and the recalculated raw count may be determined by the network device (e.g., network device 108 (e.g., network device 145)) at a predesignated time window (e.g., the next day, 24 hours later, etc.) subsequent to the predetermined time period and the predefined time window. As such, the recalculated summary count content and recalculated raw count content may include additional data received or identified by the network device (e.g., network device 108 (e.g., network device 145)) for the relevant time period for the respective service which may not have been included in the initial summary count content and the initial raw count content.

In an instance in which the apparatus (e.g., network device 108 (e.g., network device 145)) determines that the deviation between the recalculated summary count content and the recalculated raw count content still exceeds the predetermined threshold, the process repeats and returns to operation 920 to enable the apparatus (e.g., network device 109 (e.g., network device 90)) to generate another notification (e.g., another ticket) that is sent to the network device (e.g., network device 108 (e.g., network device 145)) requesting another recalculation of the summary count content and another recalculation of the raw content until the apparatus determines that the deviation is less than or equal to the predetermined threshold.

On the other hand, at operation 930, the apparatus (e.g., network device 109 (e.g., network device 90)) may receive the recalculated summary count content (e.g., data associated with the respective service) from the network device (e.g., network device 108 (e.g., network indexer 145) and may include the recalculated summary count content in a memory (e.g., a database (e.g., AQG database 93)) in response to determining that the deviation between the recalculated summary count in relation to the recalculated raw count is less than or equal to the predetermined threshold.

At operation 935, the apparatus (e.g., network device 198 (e.g., network device 90)) may utilize the recalculated summary count content to calculate a corresponding billing value indicating billing data denoting an amount of money, owed by or, to charge the entity (e.g., a consumer/user, a corporate enterprise, etc.) for utilizing or being provided the data of the respective service (e.g., a mapping service application).

It should be pointed out that FIGS. 9A and 9B are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 96, memory 36) and executed by a processor (e.g., processor 94, AQG module 97, and processor 34). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 9A and 9B above may comprise a processor (e.g., the processor 94, the AQG module 97, the processor 34) configured to perform some or each of the operations (900-935) described above. The processor may, for example, be configured to perform the operations (900-935) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (900-935) may comprise, for example, the processor 94 (e.g., as means for performing any of the operations described above), the AQG module 97, the processor 34 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for correcting data discrepancies in usage data for one or more communication devices, the method comprising:
   receiving, by an apparatus comprising a processor and a communication interface configured to communicate via at least one network, a consistency check from a network device indicating (a) a summary count and (b) a raw count, wherein (a) the summary count is obtained during a predetermined time period and specifies a number of items of data of a respective service utilized or provided, within a given time period, to the one or more communication devices of an entity and (b) the raw count is obtained during a predefined time window the expiration of which is subsequent to the predetermined time period, the raw count indicating a number of items of data of the respective service utilized or provided, within the same given time period, to the one or more communication devices;
   determining, via the apparatus, whether a deviation between the summary count in relation to the raw count is less than or equal to a predetermined threshold;
   responsive to determining that the deviation is less than or equal to the predetermined threshold, determining, by the apparatus, that the usage data for the one or more communication devices is of sufficient quality; and
   responsive to determining that the deviation exceeds the predetermined threshold, determining, by the apparatus, that the usage data for the one or more communication devices is not of sufficient quality and generating, by the apparatus, a notification that is sent to the network device requesting recalculation of the summary count and recalculation of the raw count after the predetermined time period.

2. The method of claim 1, further comprising:
   receiving summary count content associated with the summary count from the network device; and
   including the summary count content in a memory in response to determining that the deviation is less than or equal to a predetermined threshold.

3. The method of claim 2, further comprising:
   including indicia in a status table of the memory indicating that the summary count is a success denoting that a quality of the summary count meets an acceptable level.

4. The method of claim 2, further comprising:
   utilizing the summary count content (a) to calculate a corresponding billing value indicating billing data denoting an amount of money to charge the entity for utilizing or being provided the data of the respective service, or (b) for usage reporting, or (c) for performing other analytics.

5. The method of claim 1, further comprising:
   including indicia in a status table of a memory indicating that the summary count comprises a bad count denoting that a quality of the content associated with the summary count does not meet an acceptable level.

6. The method of claim 1, further comprising:
   receiving the recalculated summary count and the recalculated raw count from the network device; and
   determining whether a deviation between the recalculated summary count and the recalculated raw count is less than or equal to the predetermined threshold.

7. The method of claim 6, further comprising:
   receiving content associated with the recalculated summary count from the network device; and
   including the content associated with the recalculated summary count in a memory in response to determining that the deviation between the recalculated summary count and the recalculated raw count is less than or equal to the predetermined threshold.

8. The method of claim 7, further comprising:
   utilizing the content associated with the recalculated summary count content (a) to calculate a corresponding billing value indicating billing data denoting an amount of money to charge the entity for utilizing or being provided the data of the respective service, or (b) for usage reporting, or (c) for performing other analytics.

9. An apparatus comprising:
   at least one processor;
   a communication interface configured to communicate via at least one network; and
   at least one memory including computer program code configured to, with the at least one processor, cause the apparatus to perform at least the following:
   receive a consistency check from a network device indicating (a) a summary count and (b) a raw count, wherein (a) the summary count is obtained during a predetermined time period and specifies a number of items of data of a respective service utilized or provided, within a given time period, to the one or more communication devices of an entity and (b) the raw count is obtained during a predefined time window the expiration of which is subsequent to the predetermined time period, the raw count indicating a number of items of data of the respective service utilized or provided, within the same given time period, to the one or more communication devices;
   determine whether a deviation between the summary count in relation to the raw count is less than or equal to a predetermined threshold;
   responsive to determining that the deviation is less than or equal to the predetermined threshold, determine that the usage data for the one or more communication devices is of sufficient quality; and
   responsive to determining that the deviation exceeds the predetermined threshold, determine that the usage data for the one or more communication devices is not of sufficient quality and generate a notification that is sent to the network device requesting recalculation of the summary count and recalculation of the raw count after the predetermined time period.

10. The apparatus of claim 9, wherein the memory and computer program code are configured to, with the processor, cause the apparatus to:
- receive summary count content associated with the summary count from the network device; and
- include the summary count content in the memory in response to determining that the deviation is less than or equal to a predetermined threshold.

11. The apparatus of claim 10, wherein the memory and computer program code are configured to, with the processor, cause the apparatus to:
- include indicia in a status table of the memory indicating that the summary count is a success denoting that a quality of the summary count meets an acceptable level.

12. The apparatus of claim 10, wherein the memory and computer program code are configured to, with the processor, cause the apparatus to:
- utilize the summary count content (a) to calculate a corresponding billing value indicating billing data denoting an amount of money to charge the entity for utilizing or being provided the data of the respective service, or (b) for usage reporting, or (c) for performing other analytics.

13. The apparatus of claim 9, wherein the memory and computer program code are configured to, with the processor, cause the apparatus to:
- include indicia in a status table of the memory indicating that the summary count comprises a bad count denoting that a quality of the content associated with the summary count does not meet an acceptable level.

14. The apparatus of claim 9, wherein the memory and computer program code are configured to, with the processor, cause the apparatus to:
- receive the recalculated summary count and the recalculated raw count from the network device; and
- determine whether a deviation between the recalculated summary count and the recalculated raw count is less than or equal to the predetermined threshold.

15. The apparatus of claim 14, wherein the memory and computer program code are configured to, with the processor, cause the apparatus to:
- receive content associated with the recalculated summary count from the network device; and
- include the content associated with the recalculated summary count in the memory in response to determining that the deviation between the recalculated summary count and the recalculated raw count is less than or equal to the predetermined threshold.

16. The apparatus of claim 15, wherein the memory and computer program code are configured to, with the processor, cause the apparatus to:
- utilize the content associated with the recalculated summary count (a) to calculate a corresponding billing value indicating billing data denoting an amount of money to charge the entity for utilizing or being provided the data of the respective service, or (b) for usage reporting, or (c) for performing other analytics.

17. A computer program product comprising at least one non-transitory computer-readable storage medium having computer-readable program code portions stored therein, the computer-readable program code portions comprising program code instructions configured to:
- cause receipt of a consistency check from a network device indicating (a) a summary count and (b) a raw count, wherein (a) the summary count is obtained during a predetermined time period and specifies a number of items of data of a respective service utilized or provided, within a given time period, to the one or more communication devices of an entity and (b) the raw count is obtained during a predefined time window the expiration of which is subsequent to the predetermined time period, the raw count indicating a number of items of data of the respective service utilized or provided, within the same given time period, to the one or more communication devices;
- determine whether a deviation between the summary count in relation to the raw count is less than or equal to a predetermined threshold;
- responsive to determining that the deviation is less than or equal to the predetermined threshold, determine that the usage data for the one or more communication devices is of sufficient quality; and
- responsive to determining that the deviation exceeds the predetermined threshold, determine that the usage data for the one or more communication devices is not of sufficient quality and generate a notification that is sent to the network device requesting recalculation of the summary count and recalculation of the raw count after the predetermined time period.

18. The computer program product of claim 17, further comprising:
- program code instructions configured to cause receipt of summary count content associated with the summary count from the network device; and
- program code instructions configured to include the summary count content in the storage medium in response to determining that the deviation is less than or equal to a predetermined threshold.

* * * * *